United States Patent
Vanni

(10) Patent No.: US 8,770,096 B2
(45) Date of Patent: Jul. 8, 2014

(54) CARTRIDGE-HOLDER ASSEMBLY, AND CARTRIDGE FOR THE PREPARATION OF A BEVERAGE, PARTICULARLY COFFEE

(75) Inventor: Alfredo Vanni, Magliolo (IT)

(73) Assignee: Luigi Lavazza S.p.A., Turin (IT)

(*) Notice: Subject to any disclaimer, the term of this patent is extended or adjusted under 35 U.S.C. 154(b) by 505 days.

(21) Appl. No.: 13/058,620

(22) PCT Filed: Aug. 11, 2009

(86) PCT No.: PCT/IB2009/053531
§ 371 (c)(1),
(2), (4) Date: Feb. 11, 2011

(87) PCT Pub. No.: WO2010/018540
PCT Pub. Date: Feb. 18, 2010

(65) Prior Publication Data
US 2011/0132199 A1    Jun. 9, 2011

(30) Foreign Application Priority Data
Aug. 12, 2008 (IT) .............................. TO2008A0631

(51) Int. Cl.
*A47J 31/06* (2006.01)
(52) U.S. Cl.
USPC .......................................................... 99/295
(58) Field of Classification Search
USPC ................ 99/295, 299, 302 R, 323, 307, 306
See application file for complete search history.

(56) References Cited

U.S. PATENT DOCUMENTS

| | | | | |
|---|---|---|---|---|
| 2,283,967 A | * | 5/1942 | Brown ............................ | 99/295 |
| 5,085,135 A | * | 2/1992 | Collignon ....................... | 99/299 |
| 5,687,637 A | | 11/1997 | Brookshire et al. | |
| 5,964,143 A | | 10/1999 | Driscoll et al. | |
| 6,488,976 B1 | | 12/2002 | Priley | |

FOREIGN PATENT DOCUMENTS

| EP | 0 327 181 A1 | 8/1989 |
|---|---|---|
| EP | 0 493 856 A2 | 7/1992 |

* cited by examiner

*Primary Examiner* — Dana Ross
*Assistant Examiner* — Renee L Miller
(74) *Attorney, Agent, or Firm* — Sughrue Mion, PLLC

(57) ABSTRACT

The cartridge-holder assembly (1) comprises a cup-shaped body (2) in which there are formed
    an upper receptacle (3) adapted to receive a cartridge or pod (C) containing a substance (S) for the preparation of the beverage, and
    a lower duct (7) in communication with said receptacle (3) and intended to convey the beverage towards an underlying collecting container.
In said duct (7) there is provided a control valve device (9-15) including
    a valve seat (11),
    an associated section-throttling member (12), and
    a control device (13-15) capable of causing a relative movement of the section-throttling member (12) with respect to the seat (11), between a first and a second working position, to correspondingly vary the cross section of said duct (7) and the rate of the flow of said beverage between a minimum and a maximum value, respectively.

4 Claims, 2 Drawing Sheets

CARTRIDGE-HOLDER ASSEMBLY, AND CARTRIDGE FOR THE PREPARATION OF A BEVERAGE, PARTICULARLY COFFEE

CROSS REFERENCE TO RELATED APPLICATIONS

This application is a National Stage of International Application No. PCT/IB2009/053531 filed Aug. 11, 2009, claiming priority based on Italian Patent Application No. TO2008A000631 filed Aug. 12, 2008, the contents of all of which are incorporated herein by reference in their entirety.

The present invention relates to a cartridge-holder assembly able to be coupled to a head dispensing hot water and/or steam for the preparation of a beverage, particularly coffee.

More specifically the invention relates to a cartridge-holder assembly of the type comprising a cup-shaped body in which there are formed an upper receptacle adapted to receive a cartridge or pod containing a substance for the preparation of the beverage, and a lower duct in communication with said receptacle and intended to convey the beverage towards an underlying collecting container.

It is an object of the present invention to provide an improved cartridge-holder assembly adapted in particular to enabling the manner in which the beverage is brewed to be varied.

This and other objects are achieved according to the invention in the form of a cartridge-holder assembly of the type specified above, characterized in that in the abovementioned duct there is provided a control valve device including a valve seat, an associated section-throttling member, and control means capable of causing a relative movement of the section-throttling member with respect to said seat, between a first and a second working position, to correspondingly vary the cross section of said duct and the rate of the flow of said beverage between a minimum and a maximum value, respectively.

In a currently preferred embodiment the valve seat is fixed and the section-throttling member is movable, and the control means comprise a rotatable cam member acting on the section-throttling member.

In one illustrative embodiment the cam member is carried by a shaft which is mounted rotatably in the abovementioned body.

This body advantageously has a handle which extends along a direction forming an angle with respect to the axis of the abovementioned duct, and said handle is made to be rotatable with respect to the body about this direction, and the abovementioned shaft rotates with said handle.

The invention further relates to a cartridge for the preparation of a beverage, particularly coffee, for use in an assembly of the type defined above.

Other features and advantages of the invention will be found in the following detailed description, given purely by way of non-restrictive example with reference to the appended drawings, in which.

Figure 1:
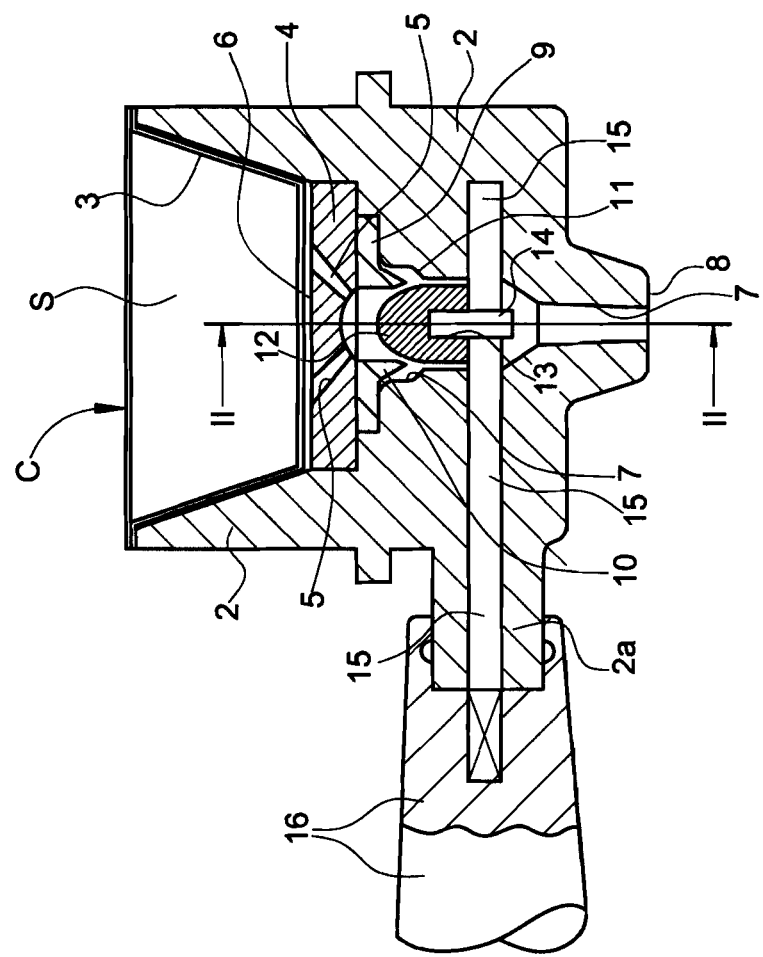
FIG. 1 is a cross section through a cartridge-holder assembly according to the invention.

In FIG. 1 the numeral 1 is a general reference for a cartridge-holder assembly according to the present invention.

The cartridge-holder assembly 1 is intended to be coupled to a head dispensing hot water and/or steam for the preparation of a beverage, particularly coffee, of a type known per se and not illustrated.

In the illustrative embodiment shown in the drawings the cartridge-holder assembly 1 comprises an essentially cup-shaped body 2 made of metallic material. In this body there is formed an upwardly open upper receptacle 3 capable of receiving a cartridge or pod C containing a substance S for preparing the beverage. The substance S may be ground roast coffee, for example.

In the example of an embodiment illustrated, the receptacle 3 has an essentially frusto-conical shape, and its lower portion contains an adapter disc 4 provided with a plurality of passages 5. Advantageously, a filter 6 made for example of a metallic material is arranged on top of the adapter disc 4.

Underneath the receptacle 3, in the body 2, is a lower duct 7 that extends underneath the adapter disc 4 to a dispensing spout 8.

In the top portion of the duct 7, immediately underneath the adapter disc 4, is an annular member 9 through which a passage 10 is defined. At the lower end of this passage, the member 9 forms a downwardly directed annular valve seat 11.

The annular member 9 may be made for example of a silicone resin.

Mounted inside the duct 7, beneath the member 9, in such a way to be axially movable, is a section-throttling member 12 made for example of metallic material.

Figure 2:
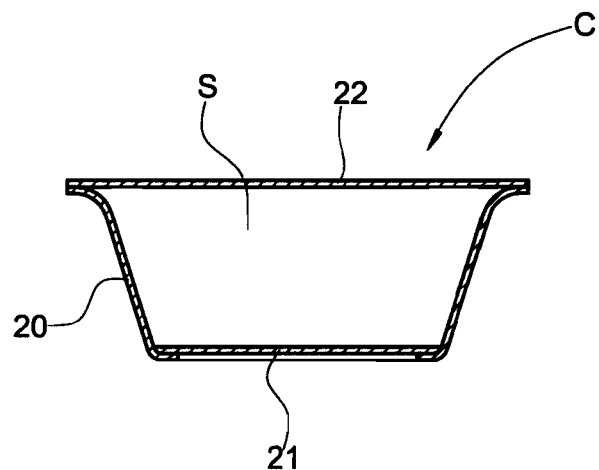
FIG. 2 is a partial cross section on II-II as marked in FIG. 1.

In the embodiment illustrated, the section-throttling member 12 is ogival in general shape and is provided underneath with a horizontal slot 13 (see also FIG. 2) in which there sits a cam member 14 mounted on a horizontal shaft 15.

The shaft 15 is mounted inside the body 2 so as to rotate about a horizontal axis, partly through a lateral projection 2a of this body, to which a handle or knob 16 is rotatably connected.

One end of the shaft 15 extends into the handle or knob 16 and is coupled to the latter so that the two rotate together.

The arrangement described above is such that a rotation of the knob 16 causes a corresponding rotation of the shaft 15 and of the associated cam member 14, which in turn brings about a vertical translational movement of the member 12 either upwards or (with the help of gravity) downwards.

The arrangement is preferably such that the member 12 is movable between an extreme raised position and an extreme lowered position, in which it defines, relative to the valve seat 11 of the member 9, in a first case a minimum cross section and in a second case a maximum cross section for the passage of the beverage. Correspondingly, the two abovementioned extreme positions of the member 12 correspond to a minimum value and maximum value, respectively, of the rate of flow of the beverage.

When the throttling member 12 is in the position corresponding to the minimum cross section of passage, the beverage is brewed at a slower pace. This maximizes the effect of extraction of substances from the pod or cartridge C.

On the other hand, when the member 12 is in the position corresponding to the maximum cross section of passage for the beverage, the beverage is brewed at a faster pace, and less of the substance S contained in the pod or cartridge C is drawn out.

By this means it is possible, using a single cartridge-holder assembly, to obtain beverages of varying characteristics, such as a "ristretto" espresso coffee, or a "lungo" coffee such as the so-called "Americano" coffee.

Figure 3:
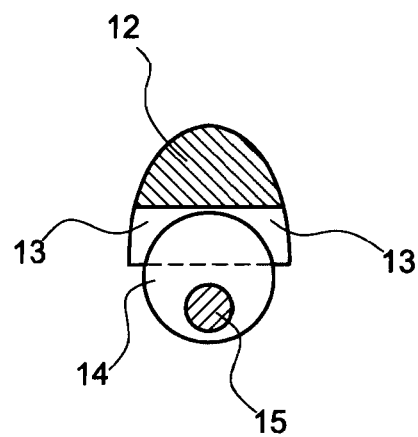
FIG. 3 is a cross section through a cartridge for the preparation of a beverage usable in a cartridge-holder assembly according to the invention.

FIG. 3 shows a cartridge C that may be used in an assembly 1 of the type described above.

In the embodiment illustrated, the cartridge C has a lateral annular wall 20 made of a plastic material, preferably biodegradable, such as polylactic acid (PLA).

The lateral wall 20 of the cartridge preferably has an essentially frusto-conical shape.

The cartridge C also has a lower wall or bottom 21 of filter paper, and an upper wall or cover 22, also conveniently made of filter paper.

The cartridge C described above is completely biodegradable.

Naturally, without departing from the principle of the invention, the embodiments and details of construction may be altered considerably from those described and illustrated purely by way of non-restrictive example, without thereby departing from the scope of the invention as defined in the attached claims.

The invention claimed is:

1. A cartridge-holder assembly (1) configured to be coupled to and uncoupled from a head dispensing hot water and/or steam for the preparation of a beverage, particularly coffee, comprising a cup-shaped body (2) in which there are formed:
    an upper receptacle (3) adapted to receive a cartridge or pod (C) containing a substance (S) for the preparation of the beverage, and
    a lower duct (7) in communication with said receptacle (3) and intended to convey the beverage towards an underlying collecting container;
    wherein in said duct (7) there is provided a control valve device (9-15) including:
    a valve seat (11),
    an associated section-throttling member (12), and
    control means (13-15) capable of causing a relative movement of the section-throttling member (12) with respect to said seat (11), between a first and a second working position, to correspondingly vary the cross section of said duct (7) and the rate of the flow of said beverage between a minimum and a maximum value, respectively;
    the valve seat (11) being fixed and the section-throttling member (12) being movable, and the control means comprising a rotatable cam member (14) which acts on the section-throttling member (12) and is carried by a shaft (15) which is mounted rotatably in said body (2),
    wherein the body (2) has a handle (16) which extends along a fixed direction forming an angle with respect to the axis of said duct (7), and wherein said handle (16) is rotatable with respect to the body (2) about said direction, said shaft (15) rotates with said handle (16), and said handle (16) is coaxial with said shaft (15).

2. Cartridge-holder assembly according to claim 1, wherein upstream of said valve seat (9, 11) there is provided a filter (6) for the beverage.

3. Cartridge-holder assembly according to claim 1, wherein the valve seat (9, 11) is made of a silicone resin.

4. Cartridge-holder assembly according to claim 1, wherein the section-throttling member (12) is made of metallic material.

* * * * *